US012461592B2

(12) United States Patent
Koizuka

(10) Patent No.: US 12,461,592 B2
(45) Date of Patent: Nov. 4, 2025

(54) COMMUNICATION ASSISTANCE SYSTEM, COMMUNICATION ASSISTANCE METHOD, AND COMMUNICATION ASSISTANCE PROGRAM

(71) Applicant: DWANGO Co., Ltd., Tokyo (JP)

(72) Inventor: Akihiko Koizuka, Tokyo (JP)

(73) Assignee: Dwango Co., Ltd., Tokyo (JP)

( * ) Notice: Subject to any disclaimer, the term of this patent is extended or adjusted under 35 U.S.C. 154(b) by 0 days.

(21) Appl. No.: 18/292,222

(22) PCT Filed: Aug. 22, 2022

(86) PCT No.: PCT/JP2022/031587
§ 371 (c)(1),
(2) Date: Jan. 25, 2024

(87) PCT Pub. No.: WO2023/032736
PCT Pub. Date: Mar. 9, 2023

(65) Prior Publication Data
US 2024/0361831 A1   Oct. 31, 2024

(30) Foreign Application Priority Data

Sep. 2, 2021   (JP) .................................. 2021-143002

(51) Int. Cl.
*G06F 3/01*    (2006.01)
*G06F 3/16*    (2006.01)
(Continued)

(52) U.S. Cl.
CPC .............. *G06F 3/013* (2013.01); *G06F 3/165* (2013.01); *G10L 17/02* (2013.01); *G10L 21/034* (2013.01); *G10L 21/0364* (2013.01)

(58) Field of Classification Search
CPC . G06F 3/013; G06F 3/165; G06F 3/01; G06F 3/0481; G06F 3/16; G06F 3/167;
(Continued)

(56) References Cited

U.S. PATENT DOCUMENTS

| 11,637,999 | B1* | 4/2023 | Tichenor | ............ G02B 27/0172 |
| | | | | 345/633 |
| 2006/0119572 | A1* | 6/2006 | Lanier | .................. G06F 1/1605 |
| | | | | 345/156 |

(Continued)

FOREIGN PATENT DOCUMENTS

| JP | 2014225801 A | 12/2014 |
| JP | 2020028084 A | * 2/2020 | ............. G06F 3/165 |

OTHER PUBLICATIONS

[English translation for ISR only] International Search Report and Written Opinion for International Patent Application No. PCT/JP2022/031587 dated Nov. 1, 2022, pp. all.

*Primary Examiner* — Sahlu Okebato
(74) *Attorney, Agent, or Firm* — Dorsey & Whitney LLP

(57) ABSTRACT

A communication assistance system related to one embodiment assists audio communication among a plurality of users. The system includes at least one processor that: specifies a second user who is a conversation partner of a first user, based on a positional relationship between a line of sight of the first user with respect to a screen and user objects, and a detection result of a speech of the first user, the screen showing a virtual space in which the user objects respectively corresponding to the users are arranged, the virtual space being two-dimensional or three-dimensional; sets a group including the first user and the second user; and outputs, to the first user, a speech voice of the second user who belongs to the group with a larger volume than a speech voice of the second user in a case where the second user does not belong to the group.

20 Claims, 10 Drawing Sheets

(51) Int. Cl.
*G10L 17/02* (2013.01)
*G10L 21/034* (2013.01)
*G10L 21/0364* (2013.01)

(58) Field of Classification Search
CPC ... G10L 17/02; G10L 21/034; G10L 21/0364; H04M 3/56; H04N 7/15
See application file for complete search history.

(56) References Cited

U.S. PATENT DOCUMENTS

2018/0095637 A1* 4/2018 Valdivia ............... H04L 51/216
2021/0174591 A1* 6/2021 Hutten .................... G06T 19/00
2022/0321370 A1* 10/2022 Skuratowicz ....... H04L 12/1822

* cited by examiner

COMMUNICATION ASSISTANCE SYSTEM, COMMUNICATION ASSISTANCE METHOD, AND COMMUNICATION ASSISTANCE PROGRAM

CROSS REFERENCE TO RELATED APPLICATION(S)

This application is a U.S. National Stage filing under 35 U.S.C. § 371 of PCT Application No. PCT/JP2022/031587, filed Aug. 22, 2022, which claims priority to Japanese Application No. 2021-143002, filed Sep. 2, 2021, which are incorporated herein by reference, in their entirety, for any purpose.

TECHNICAL FIELD

An aspect of the present disclosure relates to a communication assistance system, a communication assistance method, and a communication assistance program.

BACKGROUND ART

In a remote meeting performed online, there is known a system in which, when groups each including some of meeting attendees out of all the meeting attendees are formed, the audio of the group which a user himself or herself belongs to is made louder than the audio of the other groups (see for example, Patent Document 1).

CITATION LIST

Patent Document

Patent Document 1: Japanese Unexamined Patent Publication No. 2020-28084

SUMMARY OF THE INVENTION

Technical Problem

In the system disclosed in Patent Document 1, a group setting operation involves a manual operation (e.g., an operation using a pointing device, a keyboard, and the like) to part attendee images displayed on a group setting screen. That is, in the above-described system, a user needs to create a group through the group setting operation prior to conversation with other users. Further, the user is required to manually perform the group setting, every time the user wishes to change the group him/herself belongs to, while the conversation is taking place.

In view of the above, it is an object of an aspect of the present disclosure to provide a communication assistance system, a communication assistance method, and a communication assistance program which enable smooth and easier conversation among some users out of a plurality of users, during audio communication among the plurality of users.

Solution to the Problems

A communication assistance system related to an aspect of the present disclosure is a communication assistance system that assists audio communication among a plurality of users, and includes at least one processor. The at least one processor may: specify a second user who is a conversation partner of a first user, based on a positional relationship between a line of sight of the first user with respect to a screen and user objects, and a detection result of a speech of the first user, the screen showing a virtual space in which the user objects respectively corresponding to the plurality of users are arranged, the virtual space being two-dimensional or three-dimensional; output, to the first user, a speech voice of the second user who belongs to the group with a larger volume than a speech voice of the second user in a case where the second user does not belong to the group.

Advantages of the Invention

With the one aspect of the present disclosure, it is possible to provide a communication assistance system, a communication assistance method, and a communication assistance program which enable smooth and easier conversation among some users out of a plurality of users, during audio communication among the plurality of users.

DESCRIPTION OF EMBODIMENTS

Hereinafter, embodiments of the present disclosure will be described in detail with reference to the accompanying drawings. In the description of the drawings, the same or equivalent elements are denoted by the same reference numbers and characters, and their descriptions are not repeated.

[Overview of System]

A communication assistance system of embodiments is a computer system that assists audio communication in which a plurality of users attend. The audio communication is executed using terminal devices of the plurality of users at various locations, which are connected via any given wired or wireless communication network such as a telephone line or an Internet line. Such audio communication is also generally referred to as a web meeting, an online meeting, a remote meeting, or the like.

In the communication assistance system, each user who attends the audio communication has a terminal device (hereinafter "user terminal"). Each user speaks while viewing a screen displayed on a display of the user terminal to deliver his/her speech voice to the user terminal of another user. The speech voice of the other user is output from a speaker of the user terminal. The communication assistance system controls data (such as speech voice and the like) transmitted and received between the user terminals in this way, thereby smoothing a conversation between the users.

Note that, in the present disclosure, the expression "transmitting" data or information from a first computer to a second computer means a transmission to finally deliver data or information to the second computer. That is, the above expression encompasses a case where another computer or communication device relays data or information in the transmission.

[Overall Configuration of Communication Assistance System]

Figure 1:
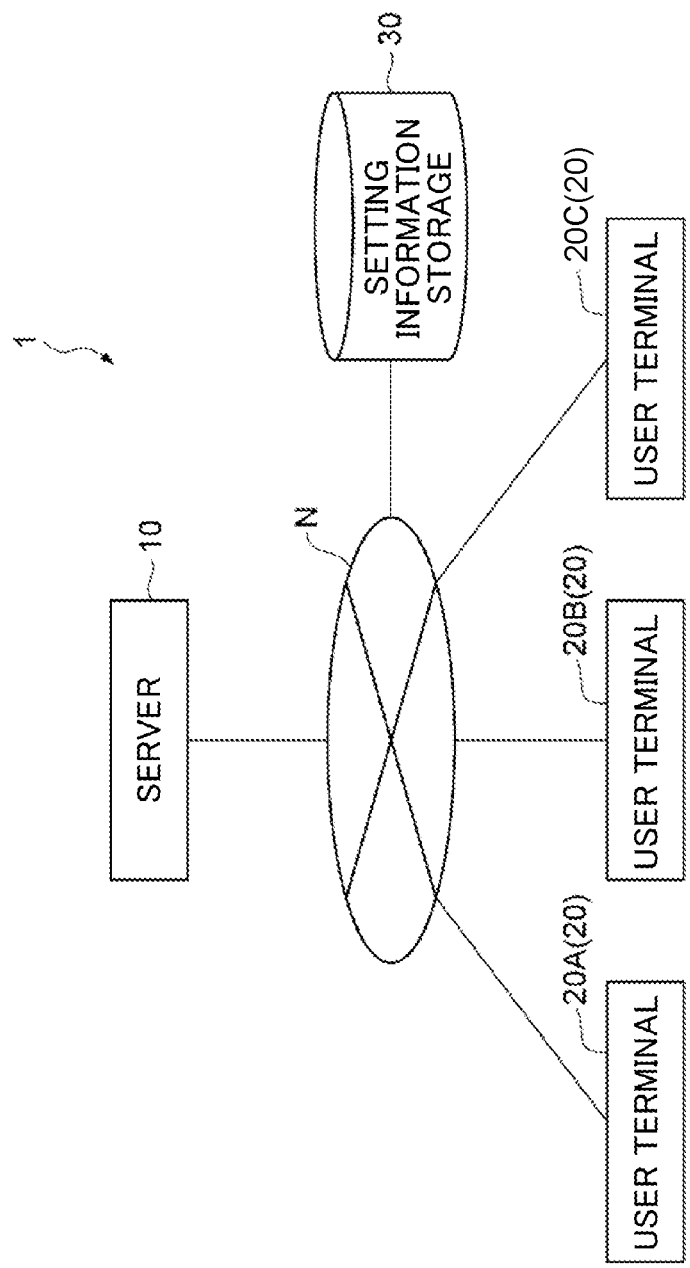
FIG. 1 is a diagram showing an exemplary application of a communication assistance system according to an embodiment.

FIG. 1 is a diagram showing an exemplary application of a communication assistance system 1 according to an embodiment. In the present embodiment, the communication assistance system 1 includes a server 10, a plurality of user terminals 20, and a setting information storage 30.

The server 10 is a computer that relays communication between the user terminals 20. The server 10 is connected to each user terminal 20 and the setting information storage 30 via a communication network N. The configuration of the communication network N is not limited. For example, the communication network N may include the internet or an intranet.

The user terminal 20 is a computer used by a user who participates in audio communication. In the present embodiment, the user terminal 20 has a function of presenting a screen that shows a two-dimensional or three-dimensional virtual space in which user objects corresponding to a plurality of users, respectively, are arranged, a function of detecting user's line of sight, a function of detecting (inputting) user's speech voice, and a function of outputting another user's speech voice. The type and configuration of the user terminal 20 are not limited. For example, each of the user terminals 20 may be a mobile terminal such as a high-function mobile phone (smartphone), a tablet terminal, a wearable terminal (for example, a head-mounted display (HMD), smart glasses, or the like), a laptop personal computer, or a mobile phone. Alternatively, each of the user terminals 20 may be a stationary terminal such as a desktop personal computer.

In this embodiment, a user terminal 20A is a user terminal of one user A (first user) focused among the plurality of users. User terminals 20B and 20C are user terminals of a user B and a user C different from the user A. Although FIG. 1 illustrates three user terminals 20, the number of user terminals 20 (that is, the number of users who attend the audio communication) is not particularly limited.

The user can attend the audio communication by, for example, operating the user terminal 20 to log in to the communication assistance system 1. The present embodiment assumes each user has logged into the communication assistance system 1.

The setting information storage 30 is a non-transitory storage medium or a storage device that stores various pieces of setting information generated or updated in the server 10. The setting information storage 30 stores, for example, arrangement information indicating the position of each user object in the virtual space, group information related to later-described groups, and the like.

A position of installing the setting information storage 30 is not limited. For example, the setting information storage 30 may be provided in a computer system different from the communication assistance system 1, or may be a component of the communication assistance system 1.

[Hardware Configuration of Communication Assistance System]

Figure 2:
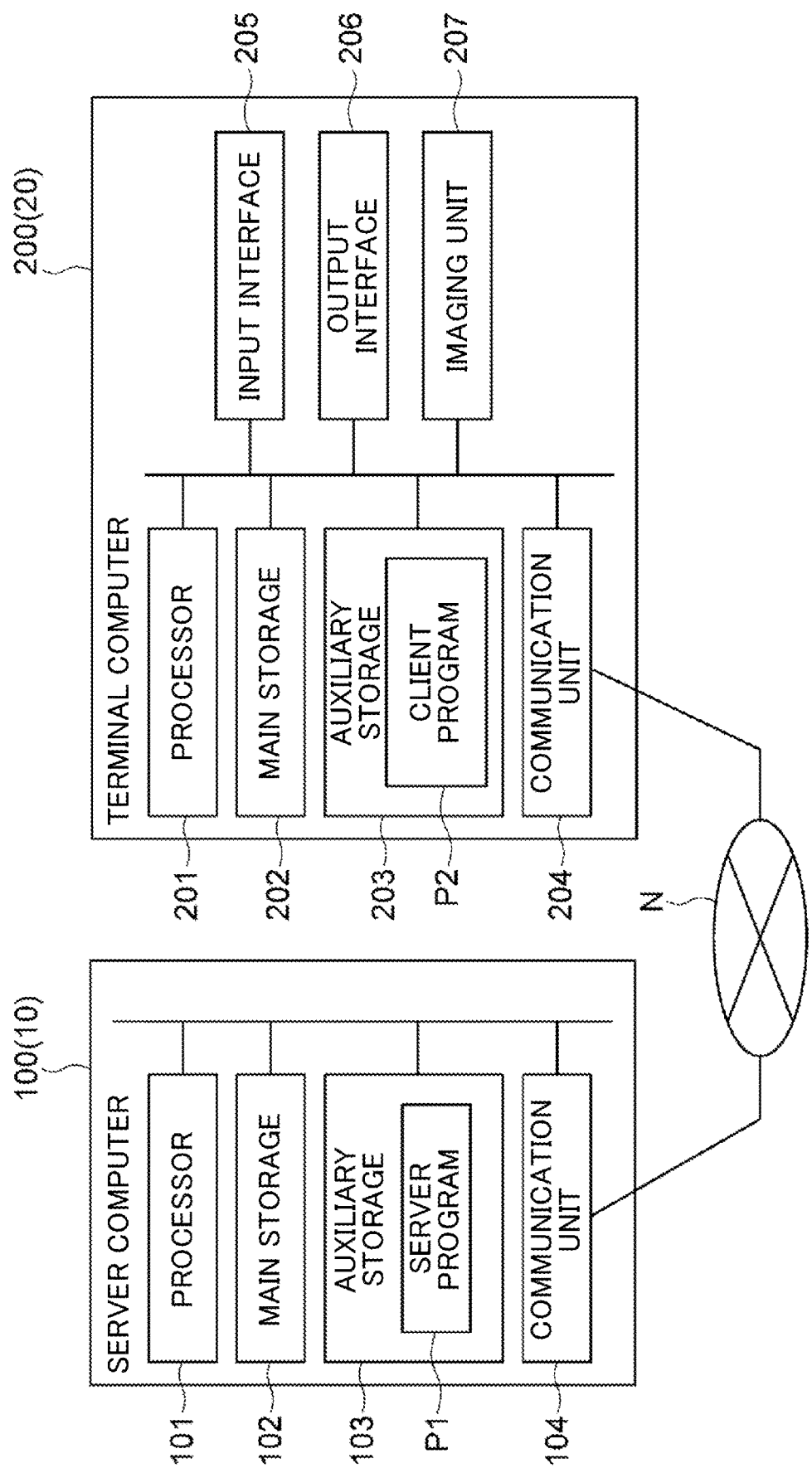
FIG. 2 is a diagram illustrating an exemplary hardware configuration related to the communication assistance system of FIG. 1.

FIG. 2 is a diagram illustrating an exemplary hardware configuration related to the communication assistance system 1. FIG. 2 shows a server computer 100 serving as the server 10, and a terminal computer 200 serving as the user terminal 20.

For example, the server computer 100 includes a processor 101, a main storage 102, an auxiliary storage 103, and a communication unit 104 as hardware components.

The processor 101 is a computing device that executes an operating system and application programs. Examples of the processor include a central processing unit (CPU) and a graphics processing unit (GPU), but the type of the processor 101 is not limited to these. For example, the processor 101 may be a combination of sensors and a dedicated circuit. The dedicated circuit may be a programmable circuit such as a field-programmable gate array (FPGA) or another type of circuit.

The main storage 102 is a device that stores a program for achieving the server 10 and computation results output from the processor 101, and the like. The main storage 102 is constituted by, for example, a read-only memory (ROM) or random access memory (RAM).

The auxiliary storage 103 is generally a device capable of storing a larger amount of data than the main storage 102. The auxiliary storage 103 is constituted by, for example, a non-volatile storage medium such as a hard disk or a flash memory. The auxiliary storage 103 stores a server program P1 that causes the server computer 100 to function as the server 10 and stores various types of data. In the present embodiment, the communication assistance program is implemented as a server program P1.

The communication unit 104 is a device that executes data communication with another computer via the communication network N. The communication unit 104 is, for example, a network card or a wireless communication module.

Each functional element of the server 10 is realized by having the processor 101 or the main storage 102 read the server program P1 and having the processor 101 execute the server program P1. The server program P1 includes codes that achieve the functional elements of the server 10. The processor 101 operates the communication unit 104 according to the server program P1, and executes reading and writing of data from and to the main storage 102 or the auxiliary storage 103. Through such processing, each functional element of the server 10 is achieved.

The server 10 may be constituted by one or more computers. In a case of using a plurality of computers, the computers are connected to each other via a communication network, so as to configure a logically single server 10.

As an example, the terminal computer 200 includes, as hardware components, a processor 201, a main storage 202, an auxiliary storage 203, a communication unit 204, an input interface 205, an output interface 206, and an imaging unit 207.

The processor 201 is a computing device that executes an operating system and application programs. The processor 201 may be, for example, a CPU or a GPU, but the type of the processor 201 is not limited to these.

The main storage 202 is a device configured to store therein programs for realizing the user terminal 20, and computation results output from the processor 201, or other data. The main storage 202 is constituted by, for example, a ROM or a RAM.

The auxiliary storage 203 is generally a device capable of storing a larger amount of data than the main storage 202. The auxiliary storage 203 is constituted by, for example, a non-volatile storage medium such as a hard disk or a flash memory. The auxiliary storage 203 stores a client program P2 for causing the terminal computer 200 to function as the user terminal 20, and various types of data.

The communication unit 204 is a device that executes data communication with another computer via the communication network N. The communication unit 204 is constituted by, for example, a network card or a wireless communication module.

The input interface 205 is a device that receives data based on a user's operation or action. For example, the input interface 205 includes at least one of a controller, a keyboard, an operation button, a pointing device, a microphone, a sensor, or a camera. In this embodiment, the input interface 205 at least includes a sensor or a camera that detects the user's line of sight and a microphone that detects the user's speech voice. The keyboard and the operation button may be displayed on the touch panel. The type of the input interface 205 is not limited, and neither is data input to the input interface 205. For example, the input interface 205 may receive data input or selected by a keyboard, an operation button, or a pointing device. Alternatively, the input interface 205 may receive audio data input through a microphone. Alternatively, the input interface 205 may receive image data (for example, video data or still image data) taken by a camera. Alternatively, the input interface 205 may receive, as motion data, data representing a user's non-verbal activity (e.g. line of sight, gesture, facial expression, or the like) detected by a motion capture function using a sensor or a camera.

The output interface 206 is a device that outputs data processed by the terminal computer 200. For example, the output interface 206 is constituted by a monitor, a touch panel, an display device such as HMD, and a speaker. The display device such displays processed data on a screen. The speaker outputs a sound represented by the processed audio data.

The imaging unit 207 is a device that captures an image of the real world, and is a camera, specifically. The imaging unit 207 may capture a moving image (video) or a still image (photograph). In a case of capturing a moving image, the imaging unit 207 processes video signals based on a given frame rate so as to yield a time-sequential series of frame images as a moving image. The imaging unit 207 can also function as the input interface 205. For example, the imaging unit 207 is provided in front of (on the user side of) the display device (the output interface 206), and captures a face image of the user. The face image of the user captured by the imaging unit 207 can be used as, for example, display information of the user object arranged in the virtual space. Note that the imaging unit 207 may be omitted in a case where the face image of the user is not displayed on the screen of the audio communication (e.g., in a case where the face image of the user is not used as the display information of the user object).

Each functional element of the user terminal 20 is achieved by having the processor 201 or the main storage 202 read the client program P2 and execute the client program P2. The client program P2 includes code for achieving each functional element of the user terminal 20. The processor 201 operates the communication unit 204, the input interface 205, the output interface 206, or the imaging unit 207 in accordance with the client program P2 to read and write data from and to the main storage 202 or the auxiliary storage 203. Through this processing, each functional element of the user terminal 20 is achieved.

At least one of the server program P1 or the client program P2 may be provided after being fixedly recorded on a tangible recording medium such as a CD-ROM, a DVD-ROM, or a semiconductor memory. Alternatively, at least one of these programs may be provided via a communication network as a data signal superimposed on a carrier wave. These programs may be separately provided or may be provided together.

[Functional Configuration of Communication Assistance System]

Figure 3:
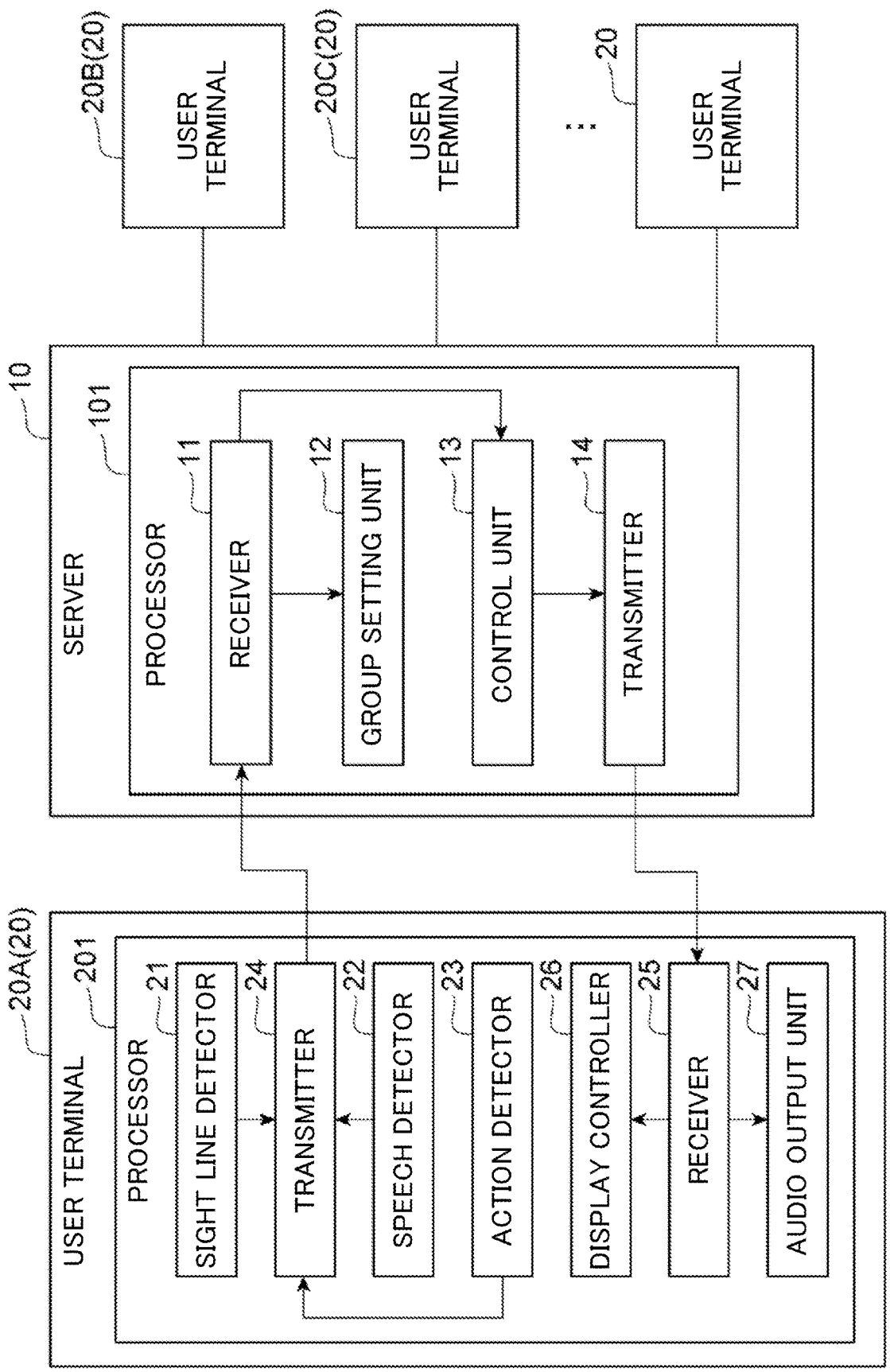
FIG. 3 is a diagram illustrating an exemplary functional configuration related to the communication assistance system of FIG. 1.

FIG. 3 is a diagram illustrating an exemplary functional configuration related to the communication assistance system 1. The server 10 includes a receiver 11, a group setting unit 12, a control unit 13, and a transmitter 14 as functional elements.

The receiver 11 receives a data signal transmitted from the user terminal 20. The data signal may include, for example, sight line information, audio data, action information, and the like. The sight line information is information related to the line of sight of the user detected by the sensor or the camera (input interface 205) of the user terminal 20. The audio data is data indicating a user's speech voice detected by the microphone (input interface 205) of the user terminal 20. The action information is information indicating a predetermined action (e.g., an operation on the controller, a gesture, and the like) of the user detected by the controller, a keyboard, a sensor, a camera, or the like (the input interface 205) of the user terminal 20.

The group setting unit 12 sets a group based on a data signal received from the user terminal 20. The group setting unit 12 performs generation (new creation) of a group, updating of a group (e.g., changes, such as addition or deletion, of group members), deletion of a group, and the like. The group and the processing of the group setting unit 12 will be detailed later. Group information related to the group set by the group setting unit 12 is stored in the setting information storage 30 (see FIG. 1).

The control unit 13 controls the audio data to be transmitted to the user terminals 20 of the users and controls the displayed content of the virtual space, based on the group information set by the group setting unit 12 (i.e., the group information stored in the setting information storage 30) and the data signal received from the user terminals 20. For example, the control unit 13 performs volume adjustment or the like of the audio data to be transmitted to each user based on the group information. The control unit 13 controls (determines) various kinds of display information in the virtual space. For example, the control unit 13 performs setting of arrangement of the user object of each user in the virtual space, setting of a group region indicating a range of a group, setting of display information associated with a group, setting of display information indicating a line of sight of a user, and the like. Specific examples of the control contents will be described later.

The transmitter 14 transmits the audio data and the display information controlled by the control unit 13 to each user terminal 20. Note that the present embodiment deals with a case where common display information is transmitted to the user terminal 20 of each user. As for the audio data, on the other hand, the audio data selected and adjusted individually for each user is transmitted to the user terminal 20 of each user. That is, for each user (each user terminal 20), the content of the audio data (volume and the like) transmitted from the server 10 (transmitter 14) is different.

The user terminals 20 each include, as functional elements, a sight line detector 21, a speech detector 22, an action detector 23, a transmitter 24, a receiver 25, a display controller 26, and an audio output unit 27.

The sight line detector 21 obtains sight line information related to the line of sight of the user, which is detected by an input interface 205 (camera or the like) of the user terminal 20. As a method of detecting the line of sight of the user, for example, an eye-tracking technology may be adopted. For example, the sight line detector 21 detects the sight line direction and focal position, and the like of the user based on the position or the state of the user's eyes (e.g., irises, pupils, and the like) through the camera (input interface 205).

The sight line detector 21 detects a gaze point of the user in the virtual space displayed on the screen of the display device (output interface 206). For example, the sight line detector 21 specifies the position in the virtual space displayed in the screen of the display device the user is gazing at, based on the positional relationship between the sight line direction and focal position of the user detected by the camera or the like and the screen of the display device. The sight line information obtained by the sight line detector 21 as described above may contain information indicating the gaze point of the user in the virtual space. For example, when the virtual space is a two-dimensional space (plane), the information indicating the gaze point can be expressed by two-dimensional coordinates (XY coordinates). Further, when the virtual space is a three-dimensional space, the information indicating the gaze point can be expressed by three-dimensional coordinates (XYZ-coordinates).

The speech detector 22 detects a speech voice of the user through a microphone (input interface 205), and obtains the detected speech voice as audio data.

The action detector 23 obtains information indicating a predetermined action (e.g., an operation on the controller, a gesture, and the like, which are predefined) of the user detected by the controller, a keyboard, a sensor, a camera, or the like (the input interface 205), and obtains action information indicating the content of the action.

The transmitter 24, when the sight line information is obtained by the sight line detector 21, transmits the sight line information to the server 10. Further, the transmitter 24, when the audio data is obtained by the speech detector 22, transmits the audio data to the server 10. Further, the transmitter 24, when the action information is obtained by the action detector 23, transmits the action information to the server 10.

The receiver 25 receives the audio data and the display information from the server 10.

The display controller 26 displays a screen showing the virtual space with user objects of each of the plurality of users who attend the audio communication on the display device (output interface 206), based on the display information received from the server 10.

The audio output unit 27 outputs, from a speaker (output interface 206), the audio data received from the server 10.

[Operation of Communication Assistance System]

Figure 4:
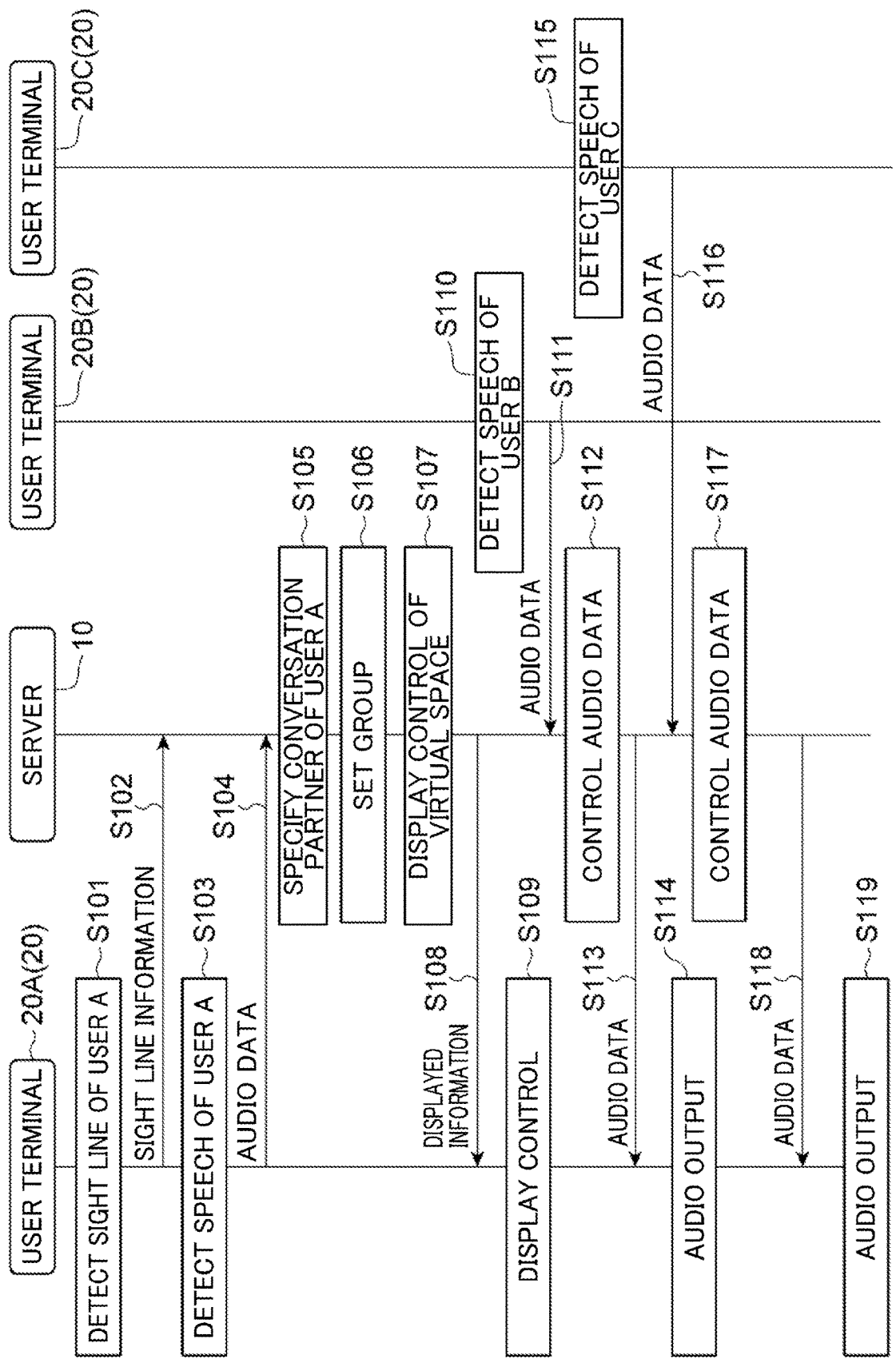
FIG. 4 is a sequence diagram illustrating an exemplary operation of the communication assistance system of FIG. 1.
Figure 5:
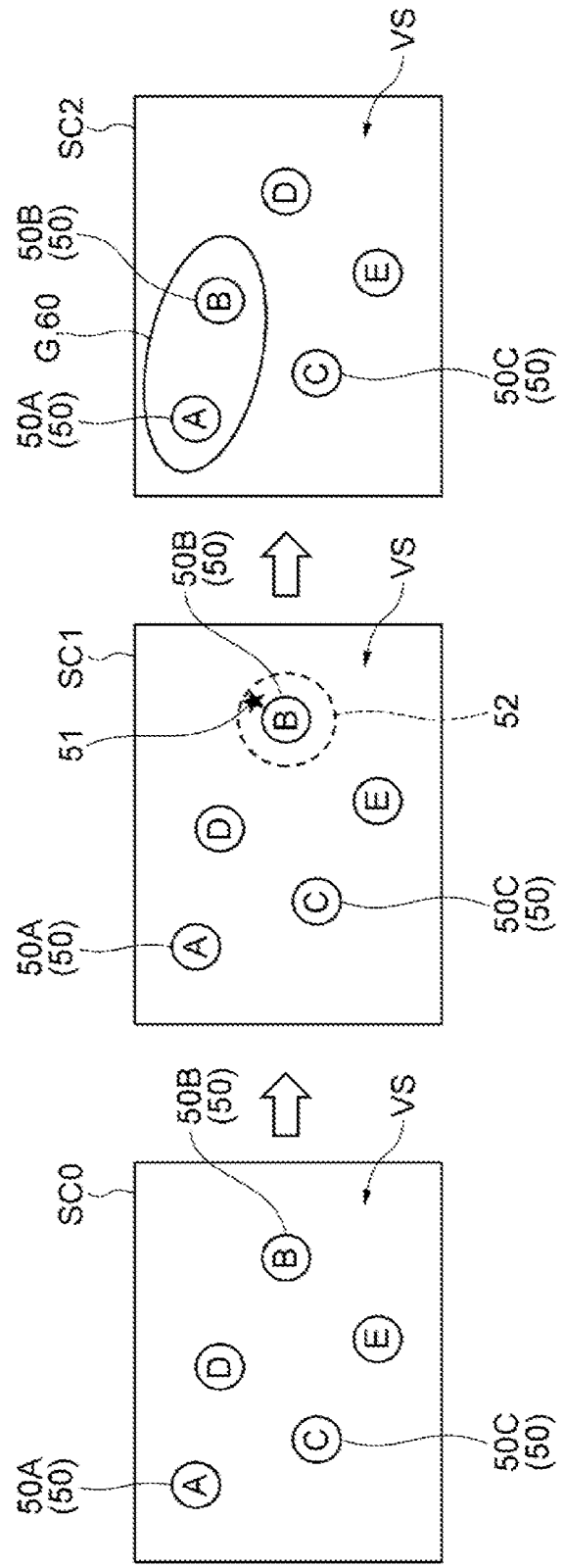
FIG. 5 is a diagram showing an exemplary screen displayed on a user terminal.

The following describes an operation of the communication assistance system 1 as well as a communication assistance method of the present embodiment, with reference to FIG. 4 and FIG. 5. FIG. 4 is a sequence diagram illustrating an exemplary operation of the communication assistance system 1. FIG. 5 is a diagram schematically showing an exemplary screen displayed on a display device of a user terminal 20 of each user. It should be noted that, as an example, a virtual space VS in which the user object 50 of each user is arranged is assumed to be a two-dimensional space (plane). In this case, user objects 50 respectively corresponding to the plurality of users (here, five users A to E) are two-dimensionally arranged in the virtual space VS, as is the case of the example shown in FIG. 5.

First, in an initial state immediately after each user has logged in the audio communication (online meeting), a screen SC0 as shown in FIG. 5 is displayed on the display device of the user terminal 20 of each user. The screen SC0 is generated by the server 10, for example. For example, the server 10 receives a login process from each user, and arranges, in the virtual space VS, the user object 50 corresponding to the user having logged in. In this way, the server 10 generates the screen SC0 showing the virtual space VS with the user objects 50 of the users and transmits the screen SC0 to the user terminals 20. Then, the display controller 26 of the user terminal 20 of each user displays the screen SC0 received from the server 10 on the display device.

Note that the display mode of the user object 50 is not particularly limited to a specific display mode, as long as the user object 50 is in a form that allows recognition of the corresponding user. For example, the user object 50 may be displayed in association with the user's name (or a part of the name, initials, or the like), a photographed image of the user, an avatar image of the user registered in advance, any combination of these, or the like. When the virtual space VS is three-dimensional space, a three-dimensional avatar object may be used in place of the above-described avatar image. Further, an image (video image) containing the face image of the user captured real time by the camera of the user terminal 20 may be used as the user object 50.

In step S101, the sight line detector 21 of the user terminal 20A of the user A (first user) detects the line of sight of the user A. In the present embodiment, the sight line detector 21 obtains sight line information including information (e.g., two-dimensional coordinates) indicating a gaze point 51 (see screen SC1 in FIG. 5) of the user in the virtual space VS. Note that the display information indicating the gaze point 51 (e.g., a star symbol shown in the screen SC1 of FIG. 5) may be displayed on the screen. In this case, the user A is able to confirm if the position which he or she is aware of himself or herself looking at coincides with the gaze point 51 estimated by the sight line detector 21, by referring to the display information indicating the gaze point 51. If the position which the user A is aware of himself or herself looking at does not coincide with the gaze point 51, the user terminal 20A may execute a calibration process to adjust the position of the gaze point 51 in response to an operation by the user A (e.g., operation on the controller, or the like).

In step S102, the transmitter 24 of the user terminal 20A transmits the sight line information of the user A to the server 10, and the receiver 11 receives the sight line information. Note that the transmission of the sight line information from the user terminal 20A to the server 10 is executed successively, for example, at predetermined time intervals.

In step S103, the speech detector 22 of the user terminal 20A detects a speech of the user A and obtains audio data indicative of the speech voice of the user A.

In step S104, the transmitter 24 of the user terminal 20A transmits the audio data of the user A to the server 10, and the receiver 11 receives the audio data.

In step S105, the group setting unit 12 specifies a conversation partner of the user A. The group setting unit 12 specifies a conversation partner of the user A, based on a positional relationship between the line of sight of the user A with respect to the screen showing the virtual space VS and the user object 50 of each user arranged in the virtual space VS, and a detection result of the speech of the user A.

For example, when the gaze point 51 of the user A indicated by the sight line information overlaps with a user object 50B (or a region 52 including the user object 50B, the same applies hereinbelow) of a specific user (in this example, the user B who is a second user) and when a speech of the user A is detected (that is, when audio data of the user A is received) as in the case of the screen SC1 shown in FIG. 5, the group setting unit 12 may specify the user B as the conversation partner of the user A.

However, there is a chance that the speech detector 22 of the user terminal 20A detecting audio data of the user A clearing his/her throat or the like while the gaze point 51 of the user A happens to overlap with the user object 50B. In such a case, the user B will be specified as the conversation partner of the user A, although the user B is not actually the conversation partner of the user A. To avoid such a case, the group setting unit 12 may specify the conversation partner of the user A through a method other than the one described hereinabove. For example, the group setting unit 12 may specify the user B as the conversation partner of the user A, when the speech of the user A is detected a predetermined threshold number of time or more or continuously detected for a predetermined threshold period of time, while the gaze point 51 of the user A overlaps the user object 50B. Alternatively, the group setting unit 12 may specify the user B as the conversation partner of the user A, in response to a speech of the user B (second user) to the user A (e.g., a speech of the user B while the gaze point of the user B aligned with the user object 50A corresponding to the user A) after the speech of the user A is detected, while the gaze point 51 of the user A overlaps with the user object 50B. Further, the group setting unit 12 may specify the user B as the conversation partner of the user A, when the speech exchange is reciprocated between the user A and the user B a predetermined threshold number of times. As described above, the group setting unit 12 may be configured to more accurately specify the conversation partner of the user A by using the positional relationship between the gaze point of the user A and the user objects 50 and the detection result of the speech of the user A as the basic information, along with other information.

Note that, in a case where the virtual space VS is a three-dimensional space and where the user objects 50 are each expressed as a three-dimensional avatar object, the user objects of the plurality of users may overlap with one another in the field of view of the user A (i.e., the screen displayed on the display device of the user terminal 20A). For example, the user A may not be able to gaze at the user object of the user C, because the user object of the user B is behind the user object of the user C. In such a case, for example, the control unit 13 may arrange an associated-object such as a speech bubble or the like associated with the user object of the user C in a position that does not overlap with the user object of the user B when viewed from the user A. Then, the group setting unit 12 may specify the user C as the conversation partner of the user A, when a speech of the user A is detected while the gaze point of the user A is aligned with the above-described associated-object.

In step S106, the group setting unit 12 sets a group G including the user A and the user B who is specified as the conversation partner of the user A in step S105. The information related to the group G (e.g., information about the members and the like included in the group G) set by the group setting unit 12 is stored in the setting information storage 30 (see FIG. 1).

The above example deals with a case where the user A and the user B do not belong to any group and therefore the group G including the user A and user B as members is newly generated by the group setting unit 12. However, if one of the user A or the user B belongs to an already-existing group, the group setting unit 12 may add the other one of the user A or user B to that already-existing group. For example, in a case where the user A is in an already-existing group (e.g., a group including the user A and user C as its members), the group setting unit 12 may add the user B as a new member of that already-existing group. That is, the group setting unit 12 may set a group including the users A, B, and C. Further, for example, in a case where the user B is in an already-existing group (e.g., a group including the user B and user C as its members), the group setting unit 12 may add the user A as a new member of that already-existing group. That is, the group setting unit 12 may set a group including the users A, B, and C.

In step S107, the control unit 13 performs display control of the virtual space VS. For example, the control unit 13 changes the position of the user objects 50 arranged in the virtual space VS or sets display information for display on the screen of the display device of the user terminal 20 of each user.

In the present embodiment, the control unit 13 changes the position of at least one of the user object 50A or the user object 50B so that the distance between the user object 50A (first user object) corresponding to the user A (first user) and the user object 50B (second user object) corresponding to the user B (second user) in the virtual space VS is shortened. Then, the control unit 13 sets a group region 60 visually indicating the range of the group G in the virtual space VS.

As shown in a screen SC2 as an example of the present embodiment, the control unit 13 swaps the positions of the user object 50 of the user D and the user object 50B of the user B, thereby bringing the user object 50B closer to the user object 50A. This operation, however, changes the position of the user object 50 of the user D in the virtual space VS irrespective of the operation of the user D, which may cause a sense of wrongness of the user D. To avoid this issue, the control unit 13 may shorten the distance between the user object 50A and the user object 50B by changing the position of at least one of the user object 50A or the user object 50B, without changing the position of the user objects 50 of the other users.

In step S108, the transmitter 14 transmits the display information to reflect the result of the display control in step S107 to the user terminal 20A, and the receiver 25 of the user terminal 20A receives the display information.

In step S109, the display controller 26 of the user terminal 20A displays the screen SC2 (see FIG. 5) reflecting therein the display information received in step S108 on its display device. In the screen SC2, the user object 50B is brought closer to the user object 50A, and a group region 60 set for the group G is displayed. In this example, the group region 60 is an oval region including therein the user objects 50A and 50B of the users A and B who are the member of the group G. The shape of the group region 60, however, is not particularly limited, and may have a shape other than the oval shape.

The user A is able to grasp a group setting state by confirming the group region 60 displayed in the screen SC2. Note that the display information reflecting the result of the display control in step S107 may be also transmitted from the server 10 to the user terminals 20 of the other users in addition to the user A and a screen similar to the screen SC2 may be displayed on the display devices of the user terminals 20. The process flow for this, however, is omitted in FIG. 4. In this way, each of the plurality of users (five users A to E in the example of FIG. 5) is able to grasp the group setting state real time, regardless of whether he/she belongs to the group.

In step S110, the speech detector 22 of the user terminal 20B detects a speech of the user B (second user) and obtains audio data indicative of the speech voice of the user B.

In step S111, the transmitter 24 of the user terminal 20B transmits the audio data of the user B to the server 10, and the receiver 11 receives the audio data.

In step S112, the control unit 13 controls the audio data of the user B obtained in step S111. More specifically, the control unit 13 adjusts the audio data of the user B to be transmitted to the user A, based on whether the user B belongs to the same group as the user A. Here, the user B belongs to the same group G as the user A. In this case, for example, the control unit 13 sets a reference volume of the audio data of the user B to a volume identical to the volume of the speech voice of the user B detected by the speech detector 22 of the user terminal 20B.

In step S113, the transmitter 14 transmits the audio data of the user B controlled in step S112 to the user terminal 20A.

In step S114, the audio output unit 27 of the user terminal 20A outputs the audio data of the user B obtained in step S113, through a speaker (output interface 206) or the like of the user terminal 20A. The volume of the audio data of the user B output from the audio output unit 27 is determined based on the reference volume set in step S112 and the speaker volume (local setting) set in the user terminal 20A.

In step S115, the speech detector 22 of the user terminal 20C detects a speech of the user C and obtains audio data indicative of the speech voice of the user C.

In step S116, the transmitter 24 of the user terminal 20C transmits the audio data of the user C to the server 10, and the receiver 11 receives the audio data.

In step S117, the control unit 13 controls the audio data of the user C obtained in step S116. More specifically, the control unit 13 adjusts the audio data of the user C to be transmitted to the user A, based on whether the user C belongs to the same group as the user A. Here, the user C does not belong to the same group G as the user A. In this case, for example, the control unit 13 sets a reference volume of the audio data of the user C to a volume smaller than the volume of the speech voice of the user C detected by the speech detector 22 of the user terminal 20C.

In step S118, the transmitter 14 transmits the audio data of the user C controlled in step S117 to the user terminal 20A.

In step S119, the audio output unit 27 of the user terminal 20A outputs the audio data of the user C obtained in step S118, through a speaker (output interface 206) or the like of the user terminal 20A. The volume of the audio data of the user C output from the audio output unit 27 is determined based on the reference volume set in step S117 and the speaker volume (local setting) set in the user terminal 20A.

While the reference volume of the audio data of the user B is set, in step S112, to be identical to the volume of the speech voice of the user B detected by the speech detector 22 of the user terminal 20B, the reference volume of the audio data of the user C is set, in step S117, to be smaller than the volume of the speech voice of the Buser C detected by the speech detector 22 of the user terminal 20C. As a result, the audio data of the user B in the same group G as the user A is more easily audible in the user terminal 20A as compared to the audio data of the user C not in the same group G as the user A. That is, if the speech volume of the user B and the speech volume of the user C are the same, the volume of the audio data of the user B output in step S114 is greater than the volume of the audio data of the user C output in step S119.

OTHER CONTROL EXAMPLES

The following describes other control examples not included in the sequence diagram of FIG. 4.

First Control Example

When the user A speaks while gazing at the group region 60 (see screen SC2 of FIG. 5) of the group G (i.e., while the gaze point 51 of the user A is at a position within the group region 60), the control unit 13 may control a first volume of the speech voice of the user A to be output to the users who belong to the group G (here, the user B other than the user A who is the speaker) so as to be greater than a second volume of the speech voice of the user A to be output to the users who do not belong to the group G (here, users C, D, and E). Note that the second volume may be 0. That is, the speech voice of the user A in the above state may be output only to the users who belong to the group G. The above configuration allows closed conversation within the group G (i.e., conversation that is hardly or not at all audible by the users outside the group G) by a simple operation of aligning the line of sight in the group region 60.

Note that, while the above configuration deals with a case where the user A speaks to the group G he/she belongs to, the same configuration is also applicable to a case where a user speaks to a group he/she does not belong to. For example, when the user C who does not belong to the group G speaks while gazing at the group region 60 of the group G, the control unit 13 may control the volume of the speech voice of the user C to be output to the users who belong to the group G (here, users A and B) so as to be greater than the volume of the speech voice of the user C to be output to the users who do not belong to the group G (here, users D and E other than the user C who is the speaker).

Second Control Example

Figure 6:
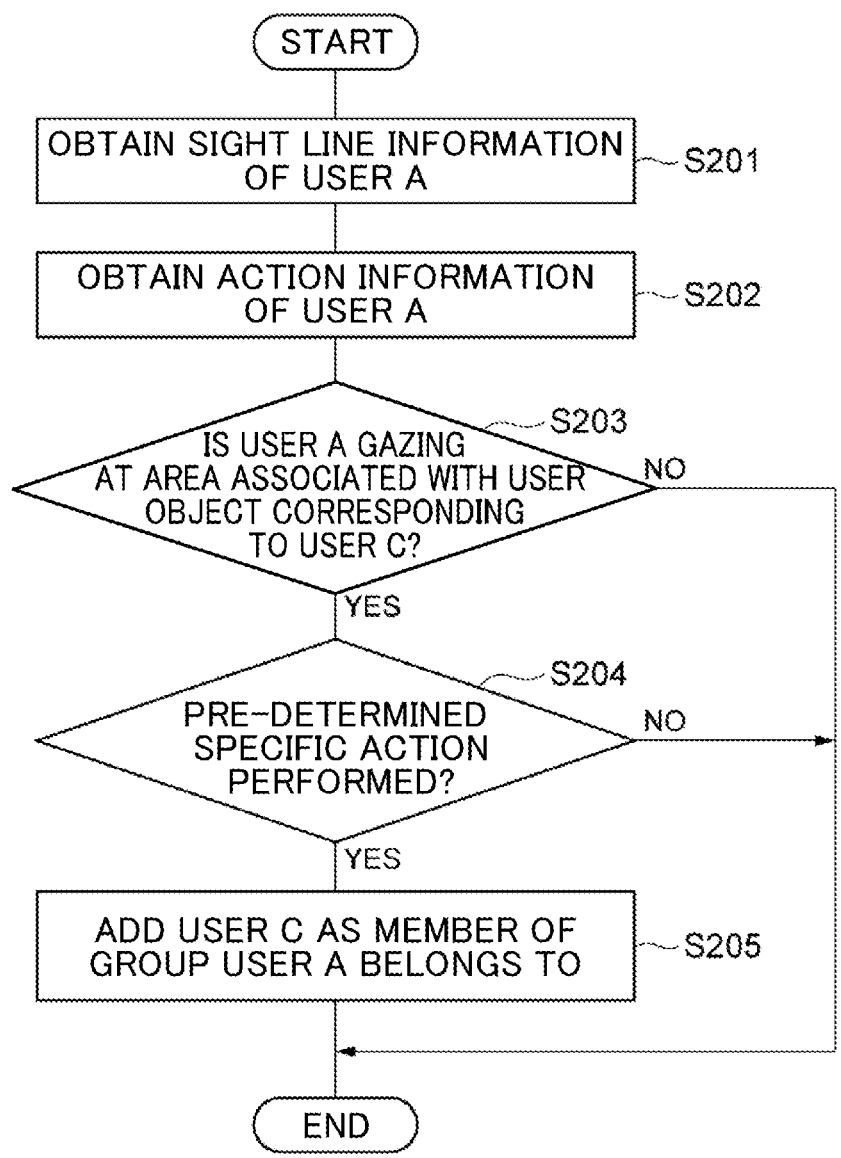
FIG. 6 is a flowchart showing an operation of a second control example.

When the user A in an already-existing group (here, the group G including the user A and the user B, for example) makes a predetermined action while the user A gazes the region associated with the user object 50C corresponding to the user C (third user) who does not belong to the group G, the control unit 13 may add the user C to that group. An exemplary operation of this control will be described hereinbelow, with reference to the flowchart shown in FIG. 6.

In step S201, the control unit 13 obtains the sight line information of the user A (first user). Specifically, the sight line information of the user A detected (obtained) by the sight line detector 21 of the user terminal 20A is transmitted from the user terminal 20A to the server 10. As a result, the control unit 13 is able to obtain the sight line information of the user A.

In step S202, the control unit 13 obtains the action information of the user A (first user). Specifically, the action information of the user A detected (obtained) by the action detector 23 of the user terminal 20A is transmitted from the user terminal 20A to the server 10. As a result, the control unit 13 is able to obtain the action information of the user A.

In step S203, the control unit 13 determines whether the user A gazes at the region associated with the user object 50C corresponding to the user C, based on the sight line information of the user A obtained in step S201. The region associated with the user object 50C may be, for example, a region showing the user object 50C, a region including a region within a predetermined distance from the user object 50C (a region nearby the user object 50C), or the above-described associated-object such as a speech bubble and the like. When the determination in step S203 results in YES, step S204 is executed. If the determination in step S203 results in NO, the process ends without adding the user C to the group the user A belongs to.

In step S204, the control unit 13 determines whether the user A has executed a predetermined specific action, based on the action information of the user A obtained in step S202. Examples of the specific action include speaking of a phrase such as "Mr./Ms. C, please come join us." (e.g., speaking of a phrase including a name indicating the user the speaker wishes to add to the group, a keyword pre-registered as an invitation to join the group, or the like), making a predetermined gesture such as beckoning, or the like. When the determination in step S204 results in YES, step S205 is executed. If the determination in step S204 results in NO, the process ends without adding the user C to the group the user A belongs to.

Figure 7:
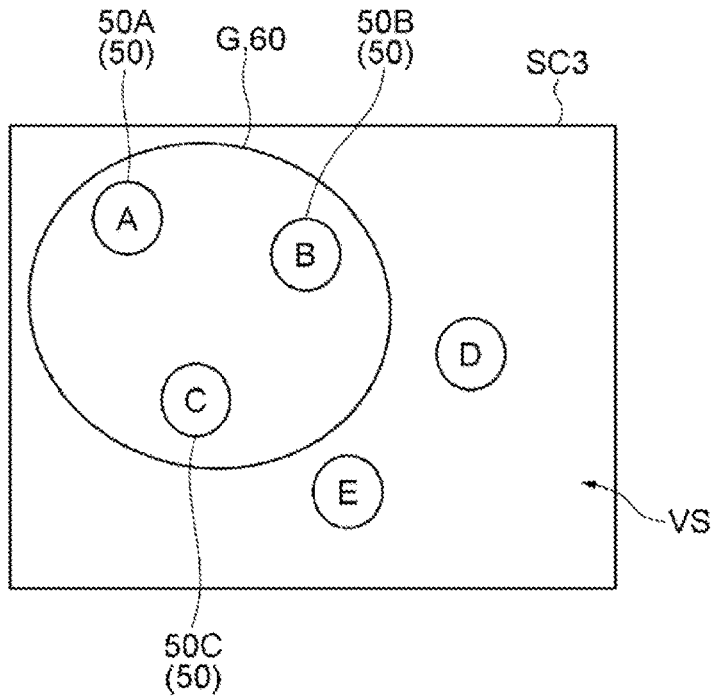
FIG. 7 is a diagram showing an exemplary screen as a result of executing the second control example.

In step S205, the control unit 13 adds the user C, as a member, to the already-existing group the user A belongs to. As a result, the user C is added as a new member of the already-existing group G including the user A and the user B, as in a screen SC3 of FIG. 7, and the group information related to the group G stored in the setting information storage 30 is updated. The group region 60 of the group G is changed to a region including the user objects 50A, 50B, and 50C of the users A, B, and C. The second control example allows addition of a new member (user C in the above example) to the already-existing group G, through a more intuitive and easier operation.

Third Control Example

Figure 8:
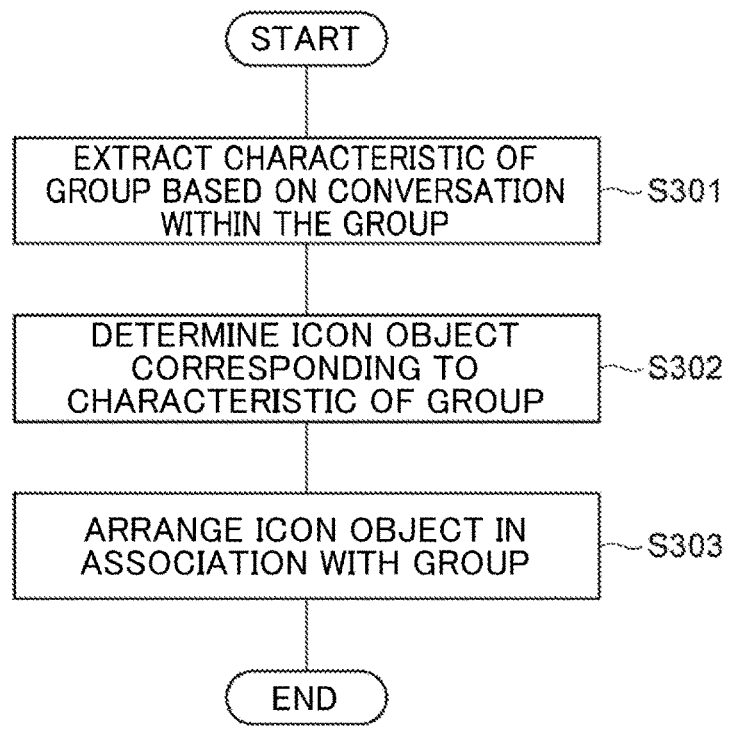
FIG. 8 is a flowchart showing an operation of a third control example.

The control unit 13 may extract a characteristic of a group based on the conversation among the users belonging to that group, and may arrange an icon object (display information) indicating the extracted characteristic in association with that group in the virtual space VS. An exemplary operation of this control will be described hereinbelow, with reference to the flowchart shown in FIG. 8.

In step S301, the control unit 13 extracts a characteristic of a group (here, group G including the users A, B, and C shown in FIG. 7, for example), based on the conversation in the group G. For example, the control unit 13 may calculate the liveliness of the conversation as the characteristic of the group G, based on the number of users speaking in the group G, the speech volumes of the users, a rate of silent state (state of no sound). Further, the control unit 13 may specify a conversation atmosphere as the characteristic of the group G, such as the conversation taking place is fun conversation or serious conversation, by a known emotion analysis based on the characteristic of a speech voice (volume, tone, speed and the like of a voice) of each user. Further, the control unit 13 may specify the conversation theme (e.g., work, politics, hobbies, and the like) based on a result of recognizing the speech content (speech recognition) of each user, and extract the specified conversation theme as the characteristic of the group G.

In step S302, the control unit 13 determines the icon object corresponding to the characteristic of the group G, which is extracted in step S301. The icon object corresponding to each characteristic may be, for example, stored (registered) in the setting information storage 30, in advance.

Figure 9:
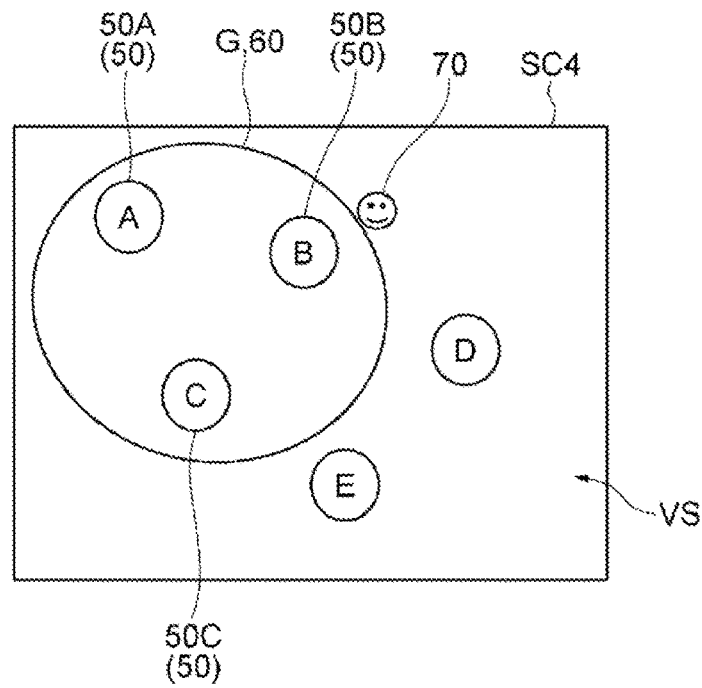
FIG. 9 is a diagram showing an exemplary screen as a result of executing the third control example.

In step S303, the control unit 13 arranges the icon object determined in step S302 in association with the group G in the virtual space VS. As a result, for the group G including the users A, B, and C, an icon object 70 corresponding to the characteristic of the group G (characteristic indicating fun conversation in this example) is arranged in association thereto, as in a screen SC4 of FIG. 9. The third control example allows each user to grasp the characteristic of the group G, based on the icon object 70 indicating the characteristic of the group G.

Fourth Control Example

Figure 10:
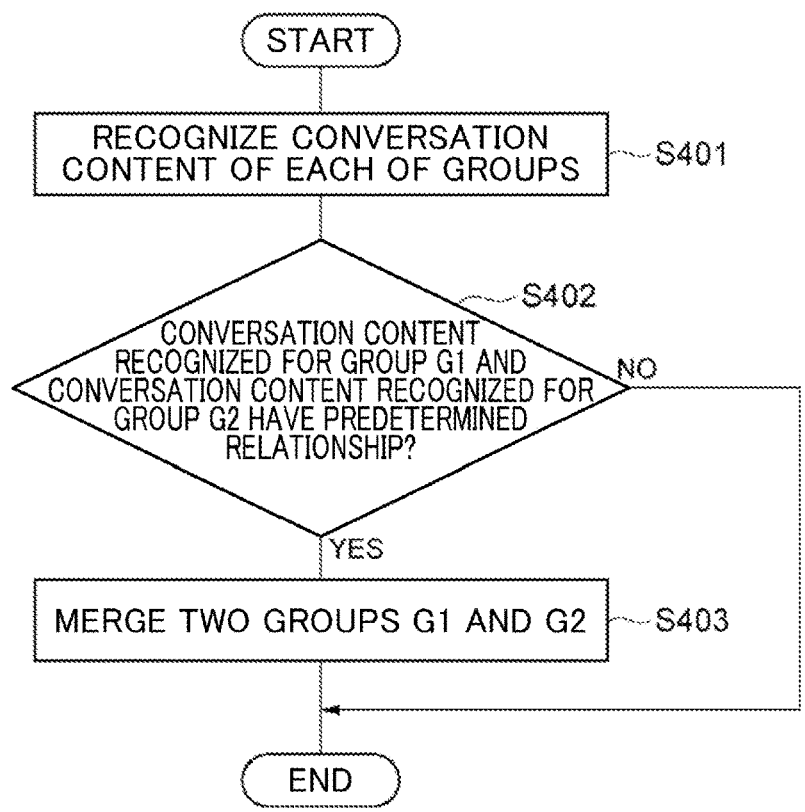
FIG. 10 is a flowchart showing an operation of a fourth control example.
Figure 11:
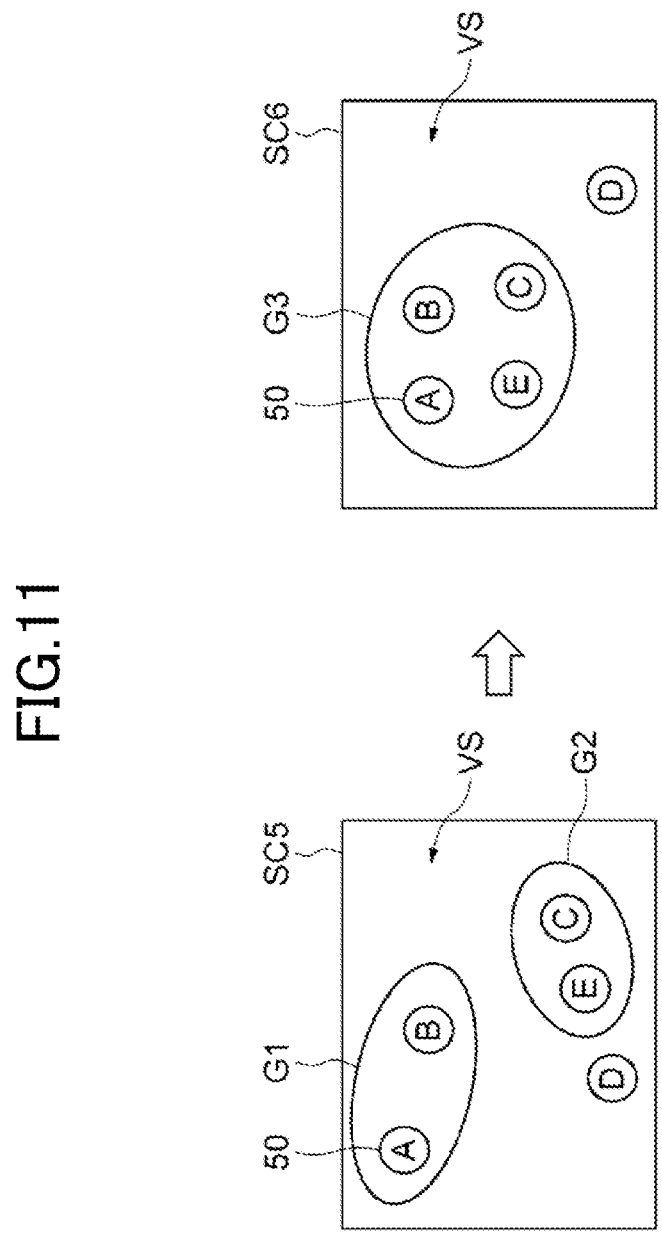
FIG. 11 is a diagram showing an exemplary screen as a result of executing the fourth control example.

In a case where a plurality of groups are set and the content of conversation among the users who belong to the respective groups is recognized, if the recognized content of the conversation in one group (third group) and the recognized content of the conversation in another group (fourth group) have a predetermined relationship, the control unit 13 may merge the one group with the other group. An exemplary operation of this control will be described hereinbelow, with reference to FIG. 10 and FIG. 11. In this example, as an initial state, there is one group G1 including the user A and the user B and another group G2 including the user C and the user E as in a screen SC5 of FIG. 11.

In step S401, the control unit 13 recognizes the content of the conversation taking place in each of the plurality of groups G1 and G2. For example, the control unit 13 may recognize the conversation theme of each of the groups G1 and G2 based on a result of recognition of speech content (speech recognition) of each user for each of the groups G1 and G2, as in the above-described third control example.

In step S402, the control unit 13 determines whether the recognized conversation content (e.g., the conversation theme, and the like) of the group G1 and the recognized conversation content of the group G2 has a predetermined relationship. For example, the control unit 13 may determine that the recognized conversation theme of the group G1 and the recognized conversation theme of the group G2 have a predetermined relationship, if these conversation themes are identical to each other or have a predetermined resemblance. On the other hand, the control unit 13 may determine that the recognized conversation theme of the group G1 and the recognized conversation theme of the group G2 do not have the predetermined relationship, if these conversation themes are neither identical to each other or have no resemblance. When the determination in step S402 results in YES, step S403 is executed. When the determination in step S402 results in NO, the group G1 and the group G2 are not merged.

In step S403, the control unit 13 merges the group G1 with the group G2. As a result, a single group G3 including the users A, B, C, and E is newly generated (set) as a result of merging the groups G1 and G2, as in a screen SC6 of FIG. 11. With the fourth control example, for example, by merging the groups G1 and G2 separately having conversation on themes that are the same as or similar to each other, it becomes possible to have conversation on the themes that are the same as or similar to each other with a larger number of users, thereby allowing more lively conversation among the users.

Fifth Control Example

Figure 12:
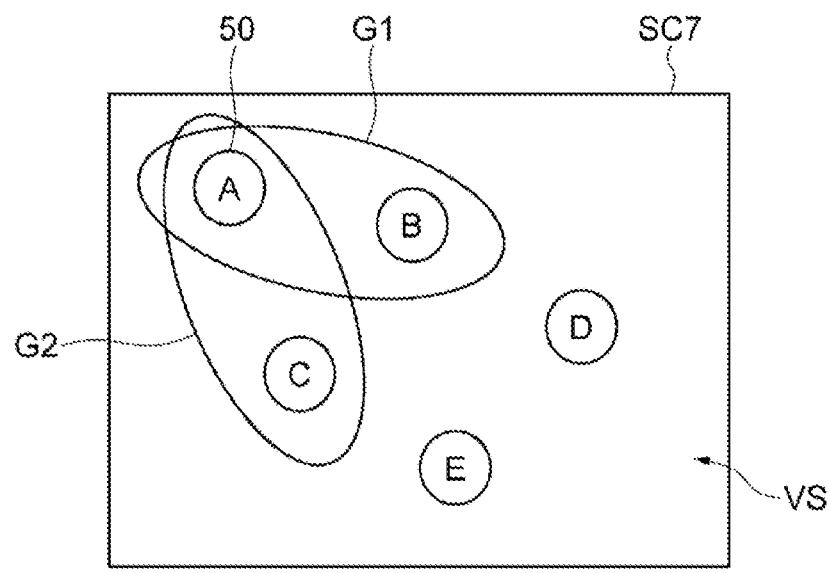
FIG. 12 is a diagram showing an exemplary screen as a result of executing a fifth control example.

As in a screen SC7 of FIG. 12, while the user A (first user) belongs to the group G1 (first group), if the user C (fourth user) who does not belong to the group G1 is specified as the conversation partner of the user A, the control unit 13 may set the group G2 (second group) including the user A and the user C while maintaining the state where the user A belongs to the group G1.

In the fifth control example, similarly to the first control example, when the user A speaks while gazing at a region that overlaps with the group region of the group G1 and not overlapping with the group region of the group G2 (i.e., while the gaze point of the user A is at a position within the group region of the group G1 and not in the group region of the group G2), the control unit 13 may control the volume of the speech voice of the user A to be output to the users who belong to the group G1 (here, user B other than the user A who is the speaker) so as to be greater than the volume of the speech voice of the user A to be output to the users who do not belong to the group G1 (here, users C, D, and E). Similarly, when the user A speaks while gazing at a region that overlaps with the group region of the group G2 and not overlapping with the group region of the group G1 (i.e., while the gaze point of the user A is at a position within the group region of the group G2 and not in the group region of the group G1), the control unit 13 may control the volume of the speech voice of the user A to be output to the users who belong to the group G2 (here, user C other than the user A who is the speaker) so as to be greater than the volume of the speech voice of the user A to be output to the users who do not belong to the group G2 (here, users B, D, and E). Such a configuration allows the user A to be in a plurality of groups G1 and G2, and allows the user A to smoothly and easily have a closed conversation in each of the groups G1 and G2 by switching the line of sight (gaze point) while speaking.

Further, in the fifth control example, the control unit 13 may determine the volume of the speech voice of the users in each of the groups G1 and G2 to be output to the user A, according to a degree of involvement of the user A in each of the groups G1 and G2. For example, the control unit 13 may set the degree of involvement of the user A in the group G1 to be higher with an increase in the amount of speech (speech time, the number of times of speech, or the like) of the user A to the group G1. That is, the control unit 13 may set the degree of involvement in the group G1 based on the amount of speech made while the user gazes at the group region corresponding to the group G1. Then, the control unit 13 may increase the volume of the speech voice of the user who belongs to the group G1 which is output to the user A, with an increase in the degree of involvement of the user A in the group G1. For example, a case where the degree of involvement of the user A in the group G1 is higher than the degree of involvement of the user A in the group G2 is considered below. In this case, if the speech volume made by the user (e.g., user B) who belongs to the group G1 is the same as the speech volume made by the user (e.g., user C) who belongs to the group G2, the control unit 13 makes the volume of the speech voice of the user B which is output to the user A greater than the volume of the speech voice of the user C which is output to the user A. In this way, when the user A belongs to a plurality of groups G1 and G2, the volume of audio of each of the groups G1 and G2 for the user A is suitably adjustable according to the degrees of involvements of the user A in the groups G1 and G2. In other words, the audio of the conversation within a group the user A puts more weight on can be output louder so that the user A is able to hear that conversation. Note that the above configuration is also applicable in a case where the user A belongs to only a single group.

Sixth Control Example

Figure 13:
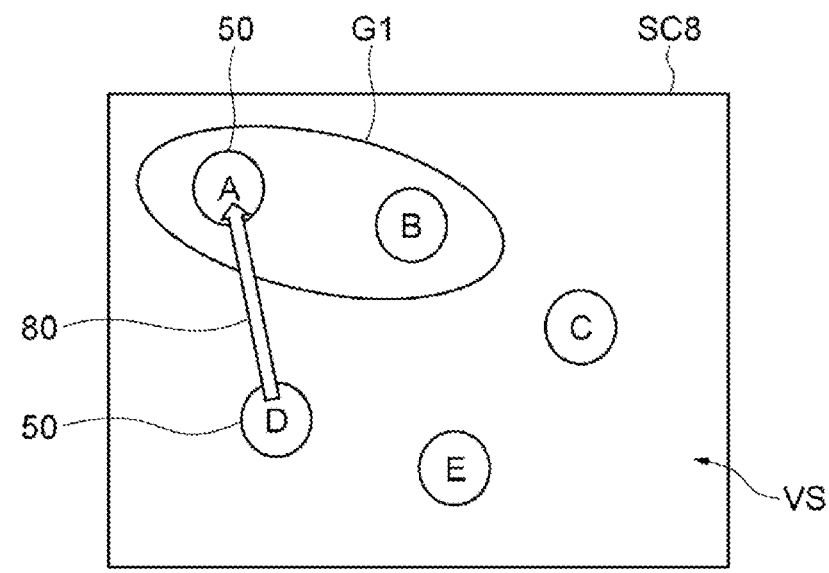
FIG. 13 is a diagram showing an exemplary screen as a result of executing a sixth control example.

The control unit 13 may arrange display information related to the line of sight of each user in the virtual space VS. A screen SC8 of FIG. 13 represents the virtual space VS with display information 80 related to a line of sight of the user D. While the display information related to the line of sight of a user other than the user D may also be arranged in the virtual space VS in actual use, this example only shows the display information 80 related to the line of sight of the user D for the sake of simplicity. Note that there may be a user who does not want other users to know his/her line of sight (where he/she is looking at). To address this, the control unit 13 may let each user set in advance whether to disclose his/her sight line information, and may arrange only the display information of the line of sight of the user who allowed disclosure of the sight line information in the virtual space VS.

In the example of FIG. 13, the user D gazes at the user object 50 corresponding to the user A in the screen displayed on the display device of the user terminal 20 of the user D, and the control unit 13 arranges the display information 80 that is an arrow-shaped object extending from the user object 50 corresponding to the user D to the user object 50 corresponding to the user A being gazed, within the virtual space VS. With the sixth control example, each user can obtain information such as who is talking with whom, who is trying to talk with whom, and who is interested in which group by referring to the display information 80 displayed in the screen SC8. Each user can select a partner to talk to or select a partner to be prompted to join the group based on such information.

Seventh Control Example

The user object 50 of each user may be configured to be movable within the virtual space VS. For example, the control unit 13 may receive a user operation from a certain user and move the user object 50 corresponding to that user in response to the user operation. Further, the speech volume may be controlled according to the distance between the user objects 50. For example, the following assumes that user objects 50A, 50B, and 50C respectively corresponding to the users A, B, and C are in the virtual space VS, that the distance between the user object 50A and the user object 50B is shorter than the distance between the user object 50A and the user object 50C, and that the user B and the user C speaks at the same volume. In this case, the control unit 13 may make the volume of the audio data of the user B output to the user A (i.e., to the user terminal 20 of the user A) greater than the volume of the audio data of the user C output to the user A. In this way, the users are provided with an intuitive and easier-to-understand system such that the voice of a person in a closer position is more easily audible than the voice of a person in a far position.

Eighth Control Example

Objects to form a group (hereinafter, group formation objects) may be arranged in the virtual space VS. The group formation objects may be displayed, for example, in the same display mode as the user object 50. For example, the group formation objects may be arranged within the virtual space VS as dummy objects (dummy avatars) imitating users (virtual attendees) who do not actually exist. The group formation objects may be associated with attributes. Examples of the attributes of the group formation objects include conversation themes (topics). Examples of the conversation themes include "politics", "music", "sports", "animation", "games", and the like. Other examples of the group attributes include a condition for attending in the group (e.g., "women only", "teenagers only", and the like). The group formation objects may be set by a service provider of the audio communication or may be set by a user attending the audio communication.

Each user can attend a group corresponding to the group formation object through a method similar to the above-described embodiments. For example, it is supposed that the user object 50B is the group formation object (e.g., a dummy avatar associated with the conversation theme of "music"), in the example of FIG. 5. In this case, the user A who wants to have conversation with another user on "music" can attend the group G corresponding to the dummy avatar, by speaking while aligning his/her line of sight with the region associated with the dummy avatar (user object 50B) arranged in the virtual space VS. Through the similar method, another user (e.g., user C) can also attend the group G corresponding to the dummy avatar. As described above, arranging a dummy avatar associated with a conversation theme in the virtual space VS allows smoother audio communication among the users. That is, by having a plurality of users (users A and C in this example) attend the group G corresponding to a single dummy avatar, the users can enjoy conversation related to the conversation theme ("music" in the above example) associated with the dummy avatar.

[Advantages]

As hereinabove described, a communication assistance system related to an aspect of the present disclosure is a communication assistance system that supports audio communication among a plurality of users, including at least one processor. The at least one processor may: specify a second user who is a conversation partner of a first user, based on a positional relationship between a line of sight of the first user with respect to a screen and user objects, and a detection result of a speech of the first user, the screen showing a virtual space in which the user objects respectively corresponding to the plurality of users are arranged, the virtual space being two-dimensional or three-dimensional; set a group including the first user and the second user; and output, to the first user, a speech voice of the second user who belongs to the group with a larger volume than a speech voice of the second user in a case where the second user does not belong to the group.

A communication assistance method related to an aspect of the present disclosure is executed by a communication assistance system including at least one processor. The communication assistance method may include: specifying a second user who is a conversation partner of a first user, based on a positional relationship between a line of sight of the first user with respect to a screen and user objects, and a detection result of a speech of the first user, the screen showing a virtual space in which the user objects respectively corresponding to a plurality of users are arranged, the virtual space being two-dimensional or three-dimensional; setting a group including the first user and the second user; and outputting, to the first user, a speech voice of the second user who belongs to the group with a larger volume than a speech voice of the second user in a case where the second user does not belong to the group.

A communication assistance program related to an aspect of the present disclosure may cause a computer to: specify a second user who is a conversation partner of a first user, based on a positional relationship between a line of sight of the first user with respect to a screen and user objects, and a detection result of a speech of the first user, the screen showing a virtual space in which the user objects respectively corresponding to a plurality of users are arranged, the virtual space being two-dimensional or three-dimensional; set a group including the first user and the second user; and output, to the first user, a speech voice of the second user who belongs to the group with a larger volume than a speech voice of the second user in a case where the second user does not belong to the group.

Such an aspect allows automatic sorting of users having a conversation into the same group, based on the line of sight of each user and the detection result of the speech of each user. Then, for each user, the speech voice of another user belonging to the same group as the user him/herself is output louder than the speech voice of a user not belonging to the same group as the user. As a result, in audio communication among the plurality of users, a conversation between some users (i.e., a conversation within a group) can be smoothly and easily performed.

In the communication assistance system, the at least one processor may change the position of at least one of a first user object corresponding to the first user or a second user object corresponding to the second user in the virtual space so that a distance between the first user object and the second user object is shortened. That is, as in the above-described embodiment (FIG. 5), the position of at least one of the user object 50A of the user A (first user) or the user object 50B of the user B (second user) to be in the same group G is changed (in the example of FIG. 5, only the user object 50B) so that the distance between the user object 50A and the user object 50B is shortened. By bringing the user objects 50A and 50B of the users A and B in the same group G closer to each other, the group region 60 indicating the group G can be displayed as compact as possible.

In the communication assistance system, the at least one processor may: set a group region visually indicating a range of the group in the virtual space; and make a first volume of a speech voice of the first user which is output to the users who belong to the group greater than a second volume of the speech voice of the first user which is output to the users who do not belong to the group, when the first user speaks while gazing at the group region. That is, the communication assistance system may have a function of executing the process of the first control example described hereinabove. The above configuration allows closed conversation within the group by a simple operation of aligning the line of sight in the group region.

In the communication assistance system, the at least one processor may: calculate a degree of involvement of the first user in the group based on an amount of speech made while the first user gazes at the group region; and determine a volume of the speech voice of the second user which is output to the first user based on the degree of involvement.

That is, the communication assistance system may have a function of the fifth control example described hereinabove. The above configuration allows suitable adjustment of the volumes of voices within the group to the first user, according to the degree of involvement of the first user in the group.

In the communication assistance system, the at least one processor may: extract a characteristic of the group based on a conversation among the users who belong to the group; and arrange, in the virtual space, display information indicating the extracted characteristic in association with the group. That is, the communication assistance system may have a function of executing the process of the third control example described hereinabove. The above configuration allows each user to grasp the characteristic of the group (e.g., the atmosphere of the group, the conversation content, and the like), based on the display information indicating the characteristic of the group (as one example, the icon object 70 shown in FIG. 9).

The communication assistance system may be such that, in response to execution of a predetermined action by the first user who belongs to the group while the first user gazes at a region associated with a third user object corresponding to a third user who does not belong to the group, the at least one processor may add the third user to the group. That is, the communication assistance system may have a function of executing the process of the second control example described hereinabove. The above-configuration allows addition of a new member to the already-existing group, through a more intuitive and easier operation.

The communication assistance system may be such that, if a fourth user who does not belong to the first group is specified as a conversation partner of the first user while the first user belongs to the first group, the at least one processor may set a second group including the first user and the fourth user while maintaining the state where the first user belongs to the first group. That is, the communication assistance system may have a function of executing the process of the fifth control example described hereinabove. Such a configuration allows the first user to be in a plurality of groups (the first group and the second group), and to smoothly and easily have a closed conversation in each of the groups by speaking while switching the line of sight (gaze point).

In the communication assistance system, the at least one processor may: in a case where a plurality of groups are set, recognize conversation content among the users who belong to the respective groups; and if the conversation content recognized for a third group and the conversation content recognized for a fourth group have a predetermined relationship, merge the third group with the fourth group. That is, the communication assistance system may have a function of executing the process of the fourth control example described hereinabove. With the above configuration, for example, by merging the groups separately having conversation on themes that are the same as or similar to each other, it becomes possible to have conversation on the themes that are the same as or similar to each other with a larger number of people, thereby allowing more lively conversation among the users.

In the communication assistance system, the at least one processor may arrange display information related to the line of sight of each of the users in the virtual space. That is, the communication assistance system may have a function of executing the process of the sixth control example described hereinabove. The above configuration can improve the convenience of the users who attend the audio communication. For example, each user can obtain information such as who is talking with whom, who is trying to talk with whom, and who is interested in which group, by referring to the display information displayed on the screen. Further, each user can choose a partner to talk to or choose a partner to invite to join the group based on such information.

[Modifications]

The present disclosure has been described above in detail based on the embodiments. However, the present disclosure is not limited to the embodiments described above. The present disclosure may be changed in various ways without departing from the spirit and scope thereof.

The above embodiments deal with a case where the communication assistance system 1 is constituted by using the server 10. However, the communication assistance system does not have to include the server 10. For example, any of a plurality of user terminals 20 may serve as a host that manages the audio communication, and may execute the above-described functions of the server 10. Alternatively, the communication assistance system may be achieved by direction communication (P2P) among a plurality of the user terminals 20. In this case, the functions of the server 10 described above may be shared and executed among the user terminals 20. In this regard, the communication assistance program may be implemented as a client program.

Some of the functions of the server 10 described above may be executed by the user terminal 20. For example, the process of specifying the conversation partner of the user A in step S105 shown in FIG. 4 may be executed on the side of the user terminal 20A. In this case, information indicating the user specified by the user terminal 20A as the conversation partner of the user A may be notified by the user terminal 20A to the server 10. Further, control of the audio data in steps S112 and S117 in FIG. 4 may be executed on the side of the user terminal 20A.

In the present disclosure, the expression "at least one processor executes a first process, a second process, and . . . executes an n-th process." or the expression corresponding thereto is a concept including the case where the execution bodies (i.e., processors) of the n processes from the first process to the n-th process change in the middle. In other words, this expression is a concept including both a case where all of the n processes are executed by the same processor and a case where the processor changes during the n processes, according to any given policy.

The processing procedure of the method executed by the at least one processor is not limited to the example of the above embodiments. For example, a part of the above-described steps (processing) may be omitted, or each step may be executed in another order. Any two or more of the above-described steps may be combined, or some of the steps may be modified or deleted. As an alternative, the method may include a step other than the steps, in addition to the steps described above.

Any part or all of each functional part described herein may be achieved by a program. The program mentioned in the present specification may be distributed by being non-temporarily recorded in a computer-readable recording medium, may be distributed via a communication line (including wireless communication) such as the Internet, or may be distributed in the state of being installed in an any given terminal.

One skilled in the art may conceive of additional effects or various modifications of the present disclosure based on the above description, but the aspect of the present disclosure is not limited to the individual embodiments described above. Various additions, modifications, and partial deletions can be made without departing from the conceptual idea and the gist of the present disclosure derived from the contents defined in the claims and equivalents thereof.

For example, a configuration described herein as a single device (or component, the same applies hereinbelow) (including configurations illustrated as a single device in the drawings) may be achieved by multiple devices. Alternatively, a configuration described herein as a plurality of devices (including configurations illustrated as a plurality of devices in the drawings) may be achieved by a single device. Alternatively, some or all of the means or functions included in a certain device (e.g., a server) may be included in another device (e.g., a user terminal).

Not all of the items described herein are essential requirements. For example, matters described herein but not recited in the claims can be referred to as optional additional matters.

The applicant is only aware of the known technology described in the "CITATION LIST" section of this document. It should also be noted that this disclosure is not necessarily intended to solve problems in that known technology. The problem to be solved by the present disclosure should be recognized in consideration of the entire specification. For example, when there is a statement herein that a particular configuration produces a certain effect, it can be said that the problem corresponding to that certain effect is solved. However, the description of the effect is not necessarily intended to make such a specific configuration an essential requirement.

DESCRIPTION OF REFERENCE CHARACTERS

1 Communication Assistance System
10 Server
11 Receiver
12 Group Setting Unit
13 Control Unit
14 Transmitter
20, 20A, 20B, 20C User Terminal
21 Sight Line Detector
22 Speech Detector
23 Action Detector
24 Transmitter
25 Receiver
26 Display Controller
27 Audio Output Unit
50, 50A, 50B, 50C User Object
60 Group Region
70 Icon Object (Display information)
80 Display information
101 Processor
201 Processor
P1 Server Program
P2 Client Program
G, G1, G2, G3 Group
SC0 to SC8 Screen
VS Virtual Space

The invention claimed is:

1. A communication assistance system that assists audio communication among a plurality of users, the communication assistance system comprising at least one processor configured to:
   detect a line of sight of a first user with respect to a screen in a real space, the screen showing a virtual space in which a plurality of user objects corresponding to the plurality of users are arranged, the virtual space being two-dimensional or three-dimensional;
   detect a speech of the first user;
   specify the second user as a conversation partner of the first user when the detected line of sight of the first user with respect to the screen in the real space overlaps with a user object corresponding to the second user in the virtual space and when the speech of the first user is detected;
   set a group including the first user and the second user if the second user is specified as the conversation partner of the first user; and
   output, to the first user, a speech voice of the second user if the second user is specified as the conversation partner of the first user and belongs to the group with a larger volume than a speech voice of the second user in a case if the second user is not specified as the conversation partner of the first user and does not belong to the group.

2. The communication assistance system according to claim 1, wherein
   the user object corresponding to the second user is a second user object, and
   the at least one processor is configured to:
      detect a positional relationship between the detected line of sight of the first user in the real space and the plurality of user objects in the virtual space; and
      when the second user is specified as the conversation partner of the first user, change a position of at least one of a first user object corresponding to the first user or the second user object in the virtual space so that a distance between the first user object and the second user object is shortened.

3. The communication assistance system according to claim 1, wherein the at least one processor is configured to:
   set a group region that visually indicates a range of the group in the virtual space; and
   when the first user speaks while gazing at the group region, make a first volume of a speech voice of the first user which is output to the users who belong to the group greater than a second volume of the speech voice of the first user which is output to the users who do not belong to the group.

4. The communication assistance system according to claim 3, wherein the at least one processor is configured to:
   calculate a degree of involvement of the first user in the group based on an amount of speech made while the first user gazes at the group region; and
   determine a volume of the speech voice of the second user which is output to the first user based on the degree of involvement.

5. The communication assistance system according to claim 1, wherein the at least one processor is configured to:
   extract a characteristic of the group based on a conversation among the users who belong to the group; and
   arrange, in the virtual space, display information indicating the extracted characteristic in association with the group.

6. The communication assistance system according to claim 1, wherein the at least one processor is configured to, in response to execution of a predetermined action by the first user who belongs to the group while the first user gazes at a region associated with a third user object corresponding to a third user who does not belong to the group, add the third user to the group.

7. The communication assistance system according to claim 1, wherein the at least one processor is configured to, if a fourth user who does not belong to the first group is specified as a conversation partner of the first user while the first user belongs to the first group, set a second group including the first user and the fourth user while maintaining a state where the first user belongs to the first group.

8. The communication assistance system according to claim 1, wherein the at least one processor is configured to:
in a case where a plurality of groups are set, recognize conversation content among the users who belong to the respective groups; and
if the conversation content recognized for a third group and the conversation content recognized for a fourth group have a predetermined relationship, merge the third group with the fourth group.

9. The communication assistance system according to claim 1, wherein the at least one processor is configured to arrange display information related to the line of sight of each of the users in the virtual space.

10. The communication assistance system according to claim 1, wherein the at least one processor is configured to:
set a group region that visually indicates a range of the group in the virtual space;
when the first user speaks while gazing at the group region, make a first volume of a speech voice of the first user which is output to the users who belong to the group greater than a second volume of the speech voice of the first user which is output to the users who do not belong to the group; and
when a third user who does not belong to the group speaks while gazing at the group region, make a third volume of a speech voice of the third user which is output to the users who belong to the group greater than a fourth volume of the speech voice of the third user which is output to the users who do not belong to the group.

11. A communication assistance method executed by a communication assistance system including at least one processor, the communication assistance method comprising:
detecting a line of sight of a first user with respect to a screen in a real space, the screen showing a virtual space in which a plurality of user objects corresponding to a plurality of users are arranged, the virtual space being two-dimensional or three-dimensional;
detecting a speech of the first user;
specifying the second user as a conversation partner of the first user when the detected line of sight of the first user with respect to the screen in the real space overlaps with a user object corresponding to the second user in the virtual space and when the speech of the first user is detected;
setting a group including the first user and the second user if the second user is specified as the conversation partner of the first user; and
outputting, to the first user, a speech voice of the second user if the second user is specified as the conversation partner of the first user and belongs to the group with a larger volume than a speech voice of the second user in a case if the second user is not specified as the conversation partner of the first user and does not belong to the group.

12. The communication assistance method according to claim 11, wherein
the user object corresponding to the second user is a second user object, and
the method further comprises:
detecting a positional relationship between the detected line of sight of the first user in the real space and the plurality of user objects in the virtual space; and
when the second user is specified as the conversation partner of the first user, changing a position of at least one of a first user object corresponding to the first user or the second user object in the virtual space so that a distance between the first user object and the second user object is shortened.

13. The communication assistance method according to claim 11, further comprising:
setting a group region that visually indicates a range of the group in the virtual space; and
when the first user speaks while gazing at the group region, making a first volume of a speech voice of the first user which is output to the users who belong to the group greater than a second volume of the speech voice of the first user which is output to the users who do not belong to the group.

14. The communication assistance method according to claim 11, further comprising:
extracting a characteristic of the group based on a conversation among the users who belong to the group; and
arranging, in the virtual space, display information indicating the extracted characteristic in association with the group.

15. The communication assistance method according to claim 11, further comprising, in response to execution of a predetermined action by the first user who belongs to the group while the first user gazes at a region associated with a third user object corresponding to a third user who does not belong to the group, adding the third user to the group.

16. The communication assistance method according to claim 11, further comprising, if a fourth user who does not belong to the first group is specified as a conversation partner of the first user while the first user belongs to the first group, setting a second group including the first user and the fourth user while maintaining a state where the first user belongs to the first group.

17. The communication assistance method according to claim 11, further comprising:
in a case where a plurality of groups are set, recognizing conversation content among the users who belong to the respective groups; and
if the conversation content recognized for a third group and the conversation content recognized for a fourth group have a predetermined relationship, merging the third group with the fourth group.

18. The communication assistance method according to claim 11, further comprising:
setting a group region that visually indicates a range of the group in the virtual space;
when the first user speaks while gazing at the group region, making a first volume of a speech voice of the first user which is output to the users who belong to the group greater than a second volume of the speech voice of the first user which is output to the users who do not belong to the group; and
when a third user who does not belong to the group speaks while gazing at the group region, making a third volume of a speech voice of the third user which is output to the users who belong to the group greater than a fourth volume of the speech voice of the third user which is output to the users who do not belong to the group.

19. A non-transitory computer-readable medium storing thereon a communication assistance program that, when executed, causes a computer to:
detect a line of sight of a first user with respect to a screen in a real space, the screen showing a virtual space in which a plurality of user objects corresponding to a plurality of users are arranged, the virtual space being two-dimensional or three-dimensional;

detect a speech of the first user;

specify the second user as a conversation partner of the first user when the detected line of sight of the first user with respect to the screen in the real space overlaps with a user object corresponding to the second user in the virtual space and when the speech of the first user is detected;

set a group including the first user and the second user if the second user is specified as the conversation partner of the first user; and output, to the first user, a speech voice of the second user if the second user is specified as the conversation partner of the first user and belongs to the group with a larger volume than a speech voice of the second user in a case if the second user is not specified as the conversation partner of the first user and does not belong to the group.

20. The non-transitory computer-readable medium according to claim 19, wherein the program, when executed, causes the computer to:

set a group region that visually indicates a range of the group in the virtual space;

when the first user speaks while gazing at the group region, make a first volume of a speech voice of the first user which is output to the users who belong to the group greater than a second volume of the speech voice of the first user which is output to the users who do not belong to the group; and when a third user who does not belong to the group speaks while gazing at the group region, make a third volume of a speech voice of the third user which is output to the users who belong to the group greater than a fourth volume of the speech voice of the third user which is output to the users who do not belong to the group.

* * * * *